United States Patent [19] [11] 3,978,278
Bouwhuis et al. [45] Aug. 31, 1976

[54] VIDEODISC READER WITH CONCAVE MIRROR ELEMENTS

[75] Inventors: Gijsbertus Bouwhuis; Adrianus Jacobus Jozef Franken; Carel Arthur Jan Simons, all of Eindhoven, Netherlands

[73] Assignee: U.S. Philips Corporation, New York, N.Y.

[22] Filed: Apr. 29, 1974

[21] Appl. No.: 464,788

[30] Foreign Application Priority Data
Feb. 15, 1974 Netherlands .................. 7402169

[52] U.S. Cl. .................. 178/6.6 R; 179/100.3 V; 178/6.7 A
[51] Int. Cl.² .................................. G11B 7/00
[58] Field of Search .............. 178/6.7 A, 6.6 R; 179/100.3 V; 350/7, 286, 287, 157

[56] References Cited
UNITED STATES PATENTS

| 3,224,330 | 12/1965 | Kompfner | 350/286 |
| 3,253,525 | 5/1966 | Merkel | 350/287 |
| 3,274,881 | 9/1966 | Sauer | 350/157 |
| 3,381,086 | 4/1968 | Moss | 179/100.3 V |
| 3,530,258 | 9/1970 | Gregg | 179/100.3 V |

OTHER PUBLICATIONS

"Optical Scanning System of the Philips 'VLP' Record Player"; Philips Tech. Rev. 33; p. 186–189; 1973, No. 7.

*Primary Examiner*—Bernard Konick
*Assistant Examiner*—Alan Faber
*Attorney, Agent, or Firm*—Frank R. Trifari; Simon L. Cohen

[57] ABSTRACT

An apparatus is described for reading a record carrier on which information is stored in an optically readable structure. Between a radiation source and an objective system a mirror system is disposed, by means of which the entrance pupil of the objective lens can be imaged onto beam-controlling elements which deflect the read beam over the information structure.

5 Claims, 3 Drawing Figures

VIDEODISC READER WITH CONCAVE MIRROR ELEMENTS

The invention relates to an apparatus for reading a record carrier on which information is stored in an optically readable trackwise structure, which apparatus includes a radiation source, which supplies at least a read beam, an objective system for focussing the read beam to a read spot on the information structure of the record carrier, beam-controlling elements for moving the read spot in at least one of the directions: transverse to the track direction and coincident with the track direction over the record carrier, and a radiation-sensitive detection system for converting the read beam which is modulated by the information structure into an electrical signal.

In this specification a radiation source is to be understood to mean a radiation-emitting element, as the case may be combined with optical means with which the radiation beam emitted by the element can be split into a read beam for reading the information on the record carrier and sub-beams. The sub-beams may be required for detecting centering errors of the read beam relative to a track to be read or a focussing error of the read beam. The radiation-sensitive detection system may then consist of a signal detector. which cooperates with the read beam, and possibly auxiliary detectors which cooperate with the sub-beams.

An apparatus of the type mentioned in the preamble is, inter alia, described in: "Philips' Technical Review", 33, No. 7, pages 186–189. The record carrier is then a round disk shaped record carrier, on which a television program is stored in a multiplicity of quasiconcentric tracks, which together constitute one continuous spiral track. The information is stored in the lengths of a multiplicity of areas and intermediate areas per track. The areas have a different influence on a read beam than the intermediate areas. A track of the record carrier can be read by projecting a read spot of dimensions of the order of the smallest detail in the track structure onto the track and by moving the read spot and the track relative to each other. For reading all tracks, the read spot and the record carrier must be moved relative to each other in a direction transverse to the track direction. For this, use is made of a coarse control and a fine control. Coarse control is effected by moving the entire optical read system relative to the record carrier. The coarse control does not become operative until the read spot is to be moved over a distance greater than a certain minimum distance. For smaller displacements the fine control is used.

With this last control only the read beam is deflected into a direction transverse to the track direction by rotation of a plane mirror which is disposed in the radiation path of the beam. In the rest position of the mirror the angle between the mirror and the optical axis of the objective system is 45°. The mirror is also employed to correct deviations in the centering of the read spot relative to a track to be read.

Apart from said centering error of the read spot, an error in the position of the read spot in the longitudinal direction of the track may occur owing to for example, out-of-roundness of the disk-shaped record carrier or centering faults of the record carrier. This last error, also called tangential error, may give rise to time base errors of the detected signal. In order to be able to compensate for the tangential error, a second rotatable mirror is disposed in the radiation path of the read beam. The axis of rotation of said mirror is perpendicular to that of the first mirror.

As the read beam is incident on each of the mirrors at an angle of approximately 45°, the read beam may become astigmatic if the mirrors are not perfectly plane. Even after reduced imaging by the objective lens, this causes a blurred spot on the information structure, whose geometrical diameter rapidly increases with the out-of-flatness of the mirrors. Even for a slight out-of-flatness the diameter becomes impermissibly large, and correct reading is no longer possible. Therefore, the mirrors should comply with stringent requirements as regards planeness. Said stringent requirements would dictate the use of thick carriers for the mirror faces. However, since it is required to correct the position of the mirrors very rapidly the use of thick carriers is preferably avoided.

Because of a rest position at 45° to the optical axis and because of the fact that it must be rotatable, the mirror nearest to the objective lens may not be disposed in the pupil of the lens. Of course, the other mirror is even further away from the pupil. As a result, a part of the read beam may fall outside the entrance pupil of the objective lens when the mirrors are rotated. Furthermore, if the degree of focussing of the read beam is determined by means of a sub-beam of smaller diameter, which beam traverses the objective lens outside the optical axis, the sub-beam will be moved over the objective lens upon rotation of the mirrors, so that a correct focussing detection is no longer possible.

The present invention provides a compact read apparatus which substantially eliminates the occurrence of astigmatism in the read beam, and in which the beam-deflecting elements may be disposed effectively in the entrance pupil of the objective lens. The apparatus according to the invention is therefore characterized in that the radiation path from the radiation source to the objective system includes a mirror system, which system comprises at least two concave mirrors, of which one mirror forms an image of the read spot and the other mirror images the entrance pupil of the objective system onto a beam-controlling element.

The invention will now be described with reference to the drawing, in which.

Figure 1:
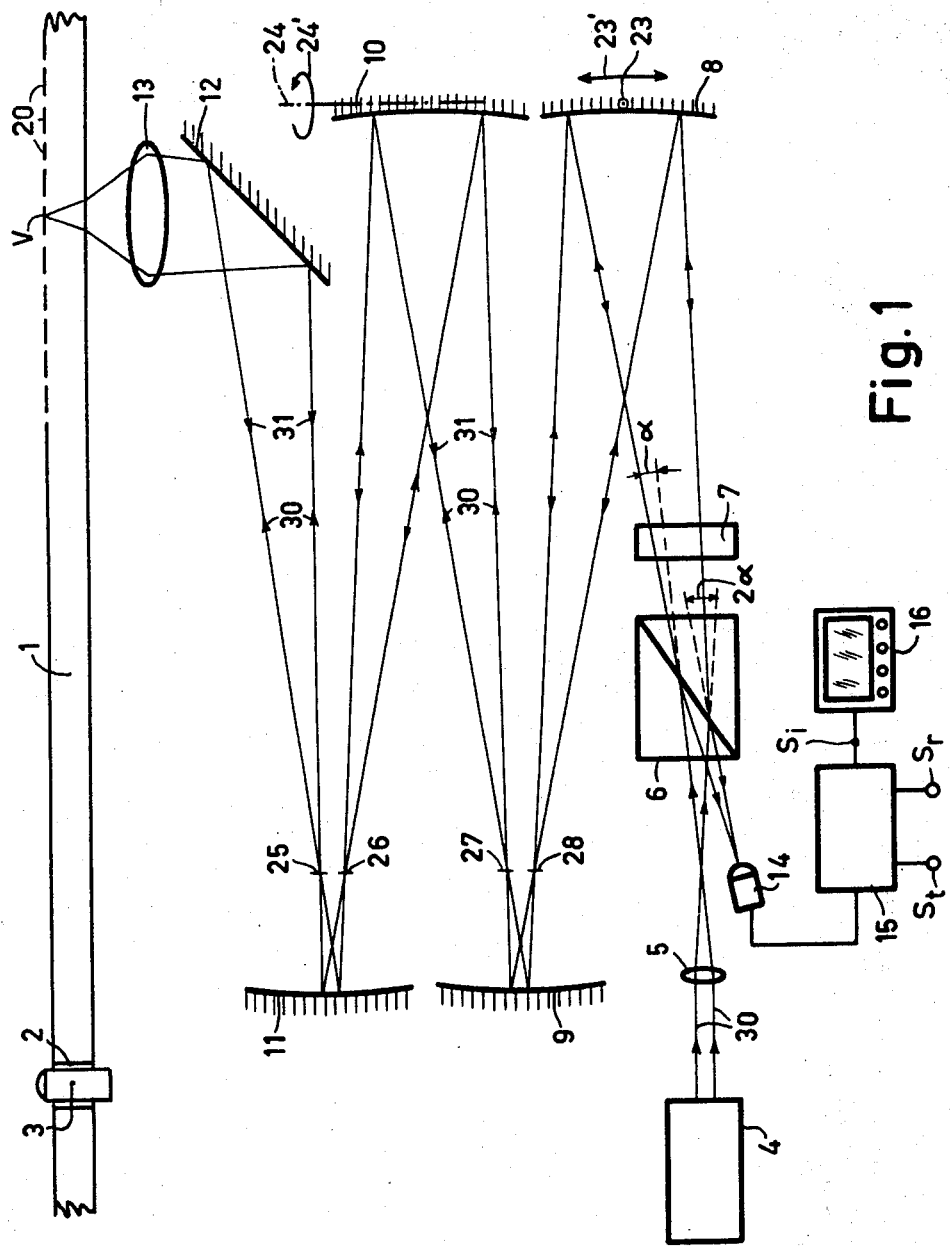
FIG. 1 shows a read apparatus, which incorporates an embodiment of a mirror assembly according to the invention.

FIG. 1 shows a round disk-shaped record carrier 1 in radial cross-section. The information is contained in tracks, schematically designated by 20. By way of example it is assumed that the tracks are disposed at the top surface of the record carrier. For reading purposes a read spot V is projected onto to the record carrier, and the record carrier is rotated with the aid of a shaft 3 which extends through a central opening 2 in the record carrier. A radiation source 4, for example a laser source, emits a narrow read beam 30. This beam passes through a lens 5 and subsequently traverses a mirror system according to the invention, consisting of four concave mirrors 8, 9, 10 and 11. Subsequently, the read beam is reflected to the objective lens 13 by a plane mirror 12, which has a fixed position. This objective lens images a small diffraction-limited read spot V on the information structure. The lens 5 ensures that the read beam 30 fills the entire entrance pupil of the objective lens 13. By using the plane mirror 12 and the mirror system 8, 9, 10, 11 it is achieved that the radiation path is substantially parallel to the plane of the record carrier, so that the dimension of read apparatus in the direction transverse to the plane of the record carrier can be small.

Upon reflection at the information structure the read beam 31 which is modulated by the information is transmitted to a radiation-sensitive detector 14 via the objective lens 13, the plane mirror 12 and the mirror system 11, 10, 9 and 8. The function of the elements 6 and 7 will be further described hereinafter. The output signal of the detector 14 is fed to an electronic circuit 15, in which in known manner an information signal $S_i$, for example a video and audio signal, can be derived. The signal $S_i$ may be rendered visible and audible for example with the aid of a conventional television receiving apparatus 16.

The mirror system according to the invention may comprise two stationary mirrors 9 and 11. These mirrors form images of the entrance pupil of the objective lens, for example with a magnification of $-1$. In FIG. 1 a concave mirror 10 is rotatably disposed at the location of the first image, formed by the concave mirror 11. The axis of rotation 24 of the mirror 10 is tangent to the surface of the mirror, is disposed in the plane of the drawing and is normal to the surface of the record carrier. Upon rotation about this axis of the mirror 10, in the direction of the arrow 24', the read spot V is moved over the surface of the information structure in the track direction. A second rotatable concave mirror 8 is disposed at the location of the second image of the entrance pupil of the objective lens formed by the concave mirror 9. The axis of rotation 23 of this mirror is tangent to the surface of this mirror, and is perpendicular to the plane of drawing. When the mirror 8 is rotated in the direction of the arrow 23', the read spot V is moved over the information structure in a radial direction.

Figure 2:
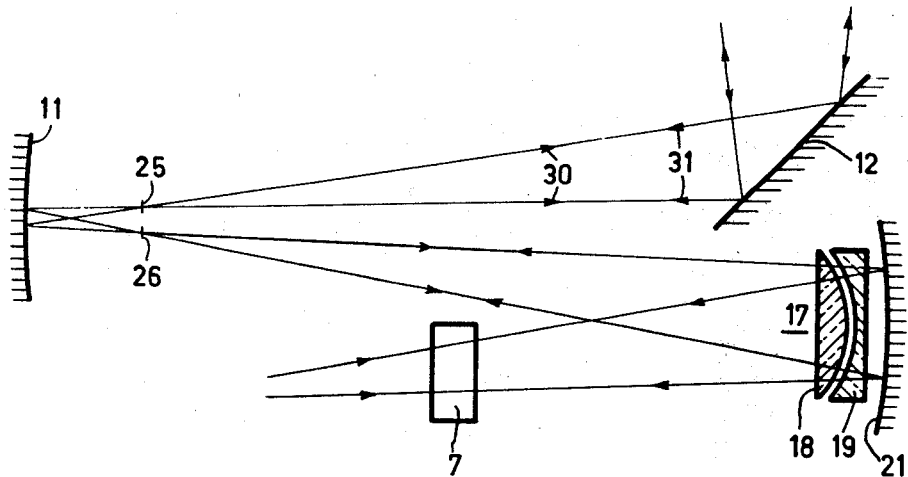
FIG. 2 shows a second embodiment of a mirror system according to the invention.

Instead of the two rotatable concave mirrors 8 and 10, it is also possible to use an assembly 17 of a plano-convex lens 18 and a plano-concave lens 19, as shown in FIG. 2. This Figure only shows the part of the read apparatus which relates to the mirror system. The assembly 17 is disposed at the location of the image of the entrance pupil of the objective lens formed by the concave mirror 11. The concave mirror 21 has a fixed position. The radii of curvature of the curved surfaces of the lenses 18 and 19 are the same, and the distance between these surfaces is very small relative to the radius of curvature. The plano-concave lens 19 can be rotated about an axis which passes through the center of curvature of the concave surface and which is perpendicular to the plane the drawing. By rotating the lens 19 the read spot V is moved over the information structure of the record carrier in the track direction. The axis of rotation of the plane-concave lens 18 passes through the center of curvature of the convex surface, is disposed in the plane of drawing and is perpendicular to the surface of the record carrier. By rotation of the lens the read spot is moved over the information structure in the longitudinal direction of the tracks.

In the mirror system shown in FIG. 1 the beam-controlling elements are effectively disposed in the entrance pupil of the objective lens. In FIG. 2 the distance between the curved surfaces of the lenses 18 and 19 is very small, for example 50–100 $\mu$, and these lenses are comparatively thin, for example of the order of 1 mm, so that both lenses are substantially effectively disposed in the entrance pupil of the objective lens. This presents a sub-beam, which is employed for focussing detection, from being moved over the pupil of the objective lens, and furthermore it prevents a situation wherein a part of the read beam might be moved outside the pupil.

Another substantial advantage of the mirror system as shown in FIGS. 1 and 2 is that the rays are incident on the mirrors at angles of substantially 90°. Thus, the risk of an astigmatic read beam being formed is virtually eliminated.

Within the scope of the present invention various modifications are possible of the embodiments of the read apparatus shown in FIGS. 1 and 2. For example, only one imaging element and only one rotatable mirror may be used in the read apparatus, which mirror is used either for a displacement in the track direction or for a displacement transverse to the track direction.

The concave mirrors in the apparatus according to FIGS. 1 and 2 have two functions: they ensure that the read beam is folded and they form images, so that no further lens elements are required. When lenses were used for imaging "false" radiation was occasionally produced by reflection at the lens surfaces; in the case of mirrors, however, it is in fact the reflection which is used. The carrier material for the mirrors need not comply with optical requirements as is the case with the lens material. For a mirror only one surface must be treated. Mirrors exhibit no double refraction, so that for the angles of incidence under consideration the polarization of a read beam is not affected.

The lens elements 18 and 19 have no image-forming function, they merely deflect the read beam.

Preferably, the read beam is not exactly focussed on the mirrors 9 and 11, but in the points 25, 26, 27 and 28 at some distance in front of them, so that the radiation spot on the mirrors is so large that flaws and extraneous substances on the mirrors, such as scratches and dust particles, no longer substantially affect the read spot.

FIGS. 1 and 2 only show the arrangement of the mirror system in one plane. The various mirrors may be disposed at different distances in front of and behind the plane of the drawing, so that a spatial configuration is obtained.

The beam-controlling elements must be rotated as a function of the deviations, in the track direction or transverse to the track direction, of the position of the read spot on the information structure. An error in the centering of the read spot relative to a track to be read may be detected by projecting, apart from the read spot V, two additional radiation spots onto the information structure, a separate detector being provided for each radiation spot. This method is known from: "Philips' Technical Review" 33, No. 7, pages 186–189 and will not be described in further detail. From the signals supplied by the detectors associated with the additional radiation spots, it is possible as already described in U.S. Pat. No. 3,876,827, to derive an indication of a deviation in the tangential direction of the read spot with the aid of a phase-shifting element. Said element causes a phase shift equal to ¼ part of the revolution period of the record carrier. In the electronic circuit 15 it is thus possible to derive a control signal $S_t$ for tangential control and a control signal $S_r$ for the radial control of the read spot. The beam controlling elements, 8 and 10 in FIG. 1, 18 and 19 in FIG. 2, may be provided with for example filamentary windings, which windings are located in a permanent-magnet field. The above-stated control signals $S_r$ and $S_t$ can be applied to the filamentary windings, thus assuring correct rotation of said elements.

By a suitable suspension of the beam-deflecting elements it is possible to ensure that the elements can only be moved in the desired direction. For example, the lens elements 18 and 19 in FIG. 2 may be connected by rods which are rotatable in bearings, the connection line of the bearings passing through the center of curvature of the curved surface of the relevant element.

In the read apparatus of FIG. 1 the incident read beam 30 must be distinguished from the modulated read beam 31. For this purpose, an element 6 and a $\lambda/4$ plate 7 are disposed in the radiation path. The element 6 might be a component polarization-sensitive beam splitting prism, which prism transmits a radiation beam which is polarized in a first direction and reflects a beam which is polarized in a second direction perpendicular to the first direction. In the apparatus of FIG. 1 the read beam passes through the $\lambda/4$ plate 7 twice, once either way. The direction of polarization of the modulated read beam is then rotated through 90° in total relative to that of the unmodulated read beam. The modulated read beam is then reflected by the polarizing component prism to a detector which is disposed outside the optical system.

Since a polarization sensitive beam splitting prism is an expensive element which is difficult to manufacture, and which is moreover very sensitive to variations of the angle of incidence of the radiation beam, and because undesired radiation which returns through the prism has the same direction as the incident radiation, it is preferred to use a doubly-refracting prism system for the element 7, as is shown in FIG. 1, which prism greatly resembles a Wollaston prism. A linearly polarized read beam 30 is deflected through an angle $\alpha$ by the prism system 6. The modulated read beam 31, whose direction of polarization has been rotated through 90° relative to that of the beam 30, is deflected by the prism 7 to the detector 14 through an angle $2\alpha$ relative to the incident beam 30.

Figure 3:
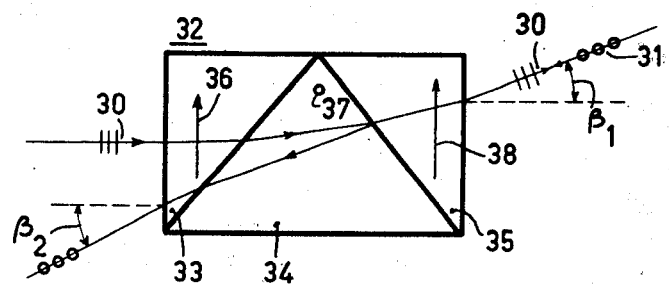
FIG. 3 shows a beam-splitting element for use in the apparatus of FIG. 1.

The prism system 6 as shown in FIG. 1, is not entirely non-astigmatic. When using such a prism in a device according to FIG. 1 one advantage of the proposed lens system would be lost. Therefore, according to the invention, a prism system 32, as shown in FIG. 3, is disposed at the location of the prism system 6. The prism system 32 consists of three component prisms 33, 34 and 35 of a doubly-refracting material. The optic axes 36 and 38 of the component prisms 33 and 35 are parallel, while the optic axis 37 of the component prism 34 is perpendicular to the optic axes 36 and 38. Owing to the symmetrical composition this prism arrangement is nonastigmatic.

FIG. 3 shows the path of the principal ray of the read beam through the prism system 32. The principal ray of the read beam 30 passes through the component prism 33 without refraction. If the direction of polarization of the beam 30 is disposed in the plane of the drawing, as indicated, the principal ray traverses the component prism 34 as the ordinary ray and the component prism 35 as the extraordinary ray and is deflected by each of the prisms through a specific angle, so that the principal ray is deflected through a total angle of $\beta_1$ relative to the direction of incidence, depending on the refractive indexes of the material of the component prisms. The modulated read beam 31 will have a direction of polarization perpendicular to the plane of the drawing. The principal ray of the beam traverses the component prism 35 as the extraordinary ray, the component prism 34 as the ordinary ray and the component prism 33 as an extraordinary ray. The principal ray of the modulated read beam 31 emerges from the prism system at an angle $\beta_2$ relative to the principal ray of the incident beam 30.

An advantage of the prism system 32 is that the angle between the incident and the returning ray ($\beta_2$) is substantially less dependent on tilting of the prism system as with the known prism system 6 in FIG. 1. As a result, less alignment problems occur when mounting the prism system 32 in the read apparatus than when mounting the prism system 6 in the read apparatus.

A further advantage of the prism system 32 is, that the component prisms 33 and 35, which have the same optic axes, also have the same shape, while the component prism 34 with a different direction of the optic axis also has a different shape. This prevents a situation from arising wherein during assembly of the prism 32, which will be a mass process when these prisms are used in a read apparatus, the component prisms with different optic axes might be interchanged.

Also when reading other than disk-shaped round record carriers, such as record carriers in the form of a tape, errors in the position of the read spot, in the longitudinal direction or transverse to the longitudinal direction of the tracks, may occur, so that also in this case a mirror system according to the invention may be employed. Instead of a television program it is also possible to store other information on the record carrier, such as for example only audio information or digital information.

In an embodiment of an apparatus according to FIG. 1 the radii of curvature of the mirrors were 160 mm. The horizontal distance between the concave mirrors was approximately 160 mm, while the vertical distance between the concave mirrors was approximately 6 mm. The blurred spot as a result of the astigmatism was smaller than the diffraction-limited read spot on the information structure.

What is claimed is:

1. An apparatus for reading a record carrier on which information is stored in track in an optical readable structure, said apparatus comprising a radiation source which supplies at least a read beam, an objective system for focussing the read beam to a read spot on the information structure of the record carrier, beam-controlling elements for deflecting the read spot over the record carrier, a radiation-sensitive detection system for converting the read beam which is modulated by the information structure into an electrical signal, and a mirror system in the radiation path from the radiation source to the objective system comprising a first concave mirror means for forming an image of the read spot and a second mirror means for imaging the entrance pupil of the objective system onto the beam-controlling elements, wherein said mirror means is positioned in said radiation path between said objective system and said beam controlling elements.

2. An apparatus as claimed in claim 1, wherein the beam-controlling elements include a rotatable concave mirror which images the read spot.

3. An apparatus as claimed in claim 1, wherein the beam controlling elements and the first and second mirror means comprise four concave mirrors, wherein a first and a second of said concave mirrors form a second image of the entrance pupil of the objective system and wherein at the location of the first and second images first and second rotatable concave mirrors of said four concave mirrors are disposed, said rotatable mirrors constituting the beam-controlling elements and the axes of rotation of the first and the second mirror being mutually perpendicular.

4. An apparatus as claimed in claim 1, wherein the beam-controlling elements are constituted by an assembly of a plano-convex lens and plano-concave lens which assembly is disposed in an image of the entrance pupil of the objective system, of which lenses the curved surfaces face each other, have substantially the same radius of curvature and have a mutual distance which is substantially smaller than the radius of curvature, at least one of the lenses being rotatable about two mutually perpendicular axes of rotation.

5. An apparatus as claimed in claim 1, wherein the radiation path between the radiation source and the mirror system includes a polarization-sensitive beam splitter and a λ/4 plate for separating the unmodulated and the modulated read beam, and wherein the polarization-sensitive beam splitter is a prism system, which is composed of three component prisms disposed after each other, the two outer component prisms having the same optic axes and substantially the same shape and dimensions, while the central component prism has a different shape and different dimensions, and an optic axis which is perpendicular to the optic axes of the other component prisms.

* * * * *

UNITED STATES PATENT AND TRADEMARK OFFICE
CERTIFICATE OF CORRECTION

PATENT NO. : 3,978,278
DATED : August 31, 1976
INVENTOR(S) : GIJSBERTUS BOUWHUIS ET AL It is certified that error appears in the above-identified patent and that said Letters Patent are hereby corrected as shown below:

Col. 1, line 27, " . " should be -- , --;

Col. 4, line 63, "Said" should be --This--;

Claim 1, line 2, "track" should be --tracks--;

line 16, before "mirror" should be --second--;

Signed and Sealed this

Ninth Day of November 1976

[SEAL]

Attest:

RUTH C. MASON
Attesting Officer

C. MARSHALL DANN
Commissioner of Patents and Trademarks